US006425318B1

(12) United States Patent
Kim

(10) Patent No.: US 6,425,318 B1
(45) Date of Patent: *Jul. 30, 2002

(54) ELECTRIC BARBECUING COOKER

(75) Inventor: Gwan-Hee Kim, Siheung (KR)

(73) Assignee: Paseco Co., Ltd., Kyonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/924,813

(22) Filed: Aug. 8, 2001

Related U.S. Application Data

(63) Continuation of application No. 09/792,914, filed on Feb. 26, 2001, now Pat. No. 6,279,462.

(30) Foreign Application Priority Data

Feb. 13, 2001 (KR) .......................................... 2001-7118

(51) Int. Cl.⁷ .............................. A23L 1/00; A47J 37/00
(52) U.S. Cl. ............................. 99/327; 99/331; 99/335; 99/342; 99/400; 99/421 H; 99/427; 99/446; 99/447; 99/451; 99/DIG. 14
(58) Field of Search ........................... 99/325–335, 339, 99/340, 400, 401, 419–421 V, 426, 427, 444–450, 481, 482, 451, DIG. 14; 126/41 R, 41 A, 9 R, 25 R; 219/400, 385

(56) References Cited

U.S. PATENT DOCUMENTS 1,263,331 A * 4/1918 Lindroth ...................... 99/446
2,618,730 A * 11/1952 Panken ...................... 99/421 H
2,696,163 A * 12/1954 Galley ....................... 99/421 H
2,762,293 A * 9/1956 Boyajian ................... 99/421 P
2,885,950 A * 5/1959 Stoll et al. ................. 99/421 H
3,104,605 A * 9/1963 McKinney ................. 99/421 H
3,125,015 A * 3/1964 Schlaegel .................. 99/421 P
3,196,776 A * 7/1965 Norton ...................... 99/421 P
3,205,812 A * 9/1965 Booth ....................... 99/421 P
3,296,957 A * 1/1967 Gagnon et al. ............... 99/444
3,333,529 A * 8/1967 Wilson ..................... 99/421 P
3,832,989 A * 9/1974 Belford ...................... 126/25 R
3,951,052 A   4/1976 Ringo ......................... 99/427
4,214,516 A * 7/1980 Friedl et al. .................. 99/447
4,643,163 A   2/1987 Martinez .................... 126/41 A
4,681,083 A   7/1987 Shu .............................. 126/9 R
4,957,039 A   9/1990 Reyes ........................... 99/340
6,035,770 A   3/2000 Whitefield ................... 99/482
6,279,462 B1 * 8/2001 Kim ............................. 99/327

* cited by examiner

Primary Examiner—Timothy F. Simone
(74) Attorney, Agent, or Firm—Lee & Hong

(57) ABSTRACT

A barbecuing cooker uses infrared rays to cook the food contained therein to provide excellent taste and nutrition and to permit easy cleaning of the cooking chamber as well as handy mounting or dismounting of spits. The barbecuing cooker comprises a main body with side and rear reflecting plates as the inner walls of a cooking chamber, an upper and lower door for opening or closing the inlet opening of the cooking chamber, a ceramic heater, spits provided rotatably through gear wheels, a motor for operating the gear wheels, a control panel for controlling the ceramic heater and motor, an oil receiver and a parching cage.

10 Claims, 10 Drawing Sheets

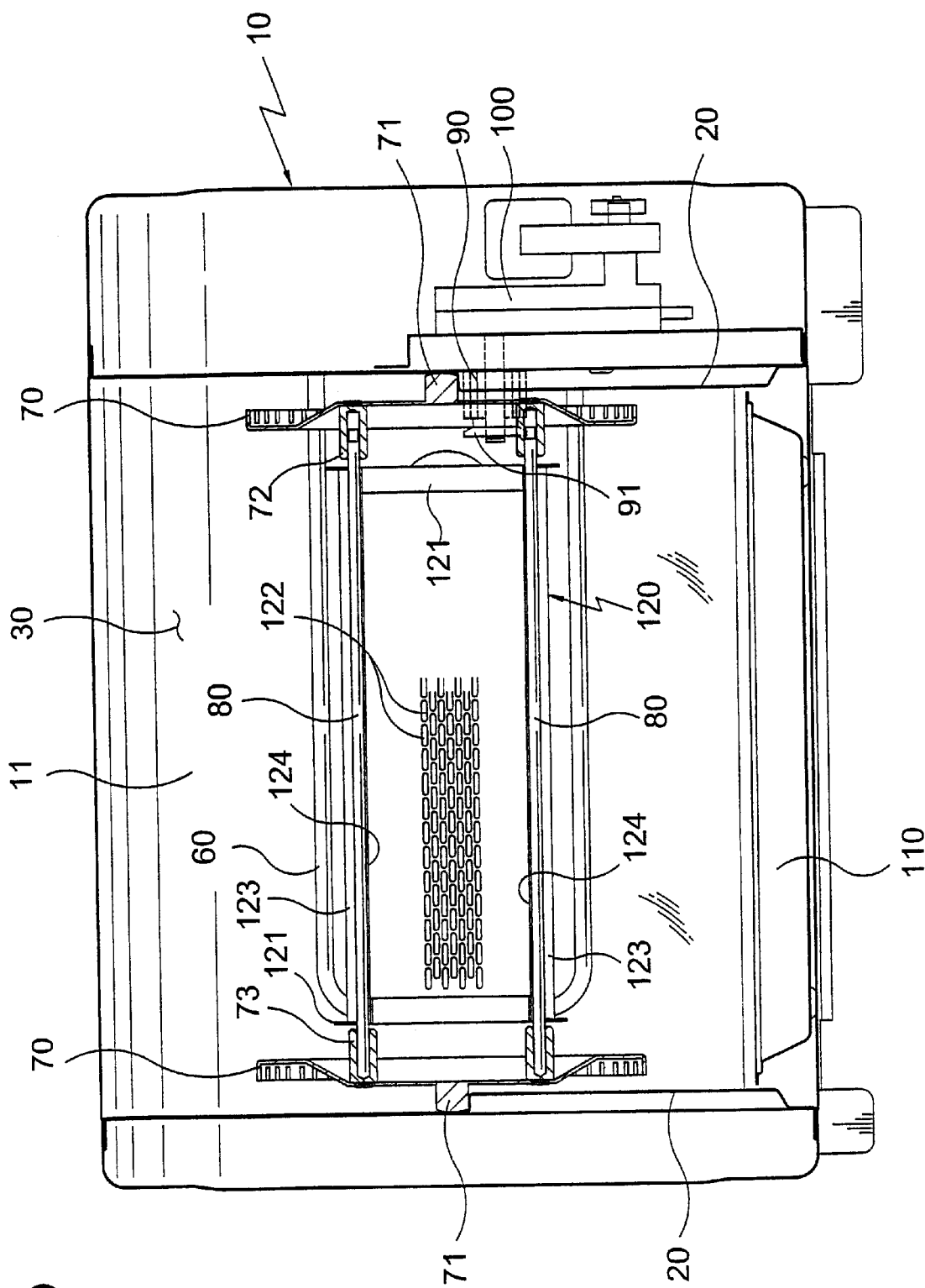

US 6,425,318 B1

ELECTRIC BARBECUING COOKER

This is a continuation of application Ser. No. 09/792,914 filed Feb. 26, 2001, U.S. Pat. No. 6,279,462 which application is hereby incorporated by reference in its entirety.

FIELD OF THE INVENTION

The present invention relates to a barbecuing cooker, and more particularly to a barbecuing cooker by which coffee beans, beans, corns or popcorns can be parched beside a convenient barbecue cooking of chickens, turkeys, ducks, steak, fishes and the like, in which far infrared ray emitters are installed so as to provide a quality meat with excellent taste and nutrition and which is so constructed as to permit easy cleaning of the cooking chamber as well as handy mounting or dismounting of spits.

Generally, an electric barbecuing device is used to broil meat by applying heat while slowly rotating raw meat stuck with spits by using a motor. However, conventional electric barbecuing devices were not satisfactory enough, because they could not serve various combined uses due to their monotonous construction solely intended for broiling meat.

The conventional electric barbecuing cookers could cook easily meats like chickens, turkeys and ducks on spits but had difficulty cooking steak or fishes because of structural reason. There was a problem of unbalanced cooking on the surface and in the inside of the meat due to the use of inefficient ordinary heaters.

Another problem with the conventional barbecuing cookers was that cleaning work for the cooking chamber and mounting or dismantling of spits were obstructed for the constructional reason.

BRIEF DESCRIPTION OF THE INVENTION

The present invention is intended, by overcoming the drawbacks as descried above, to provide a barbecuing cooker by means of which parching of coffee beans, beans, corns or popcorns is possible when needed beside a convenient barbecue cooking of chickens, turkeys, ducks, steak, fishes and the like, which permits preparation of a quality meat with excellent taste and nutrition and which is so constructed as to permit easy cleaning of the cooking chamber as well as handy mounting or dismounting of spits.

To that end, it is provided according to the invention that a ceramic heater is disposed on a rear reflecting plate in a cooking chamber to emit far infrared rays during cooking time, the upper and lower doors for closing or opening the long inlet opening for the cooking room are provided, the rear reflecting plate and oil receiver are coated on their surfaces with nonstick ceramics. Furthermore, a parching cage formed with a number of perforations, which cage is formed on opposite side surfaces with longitudinal grooves is optionally assembled to the spits for meat. And still further a basket made of wire gauges for broiling raw steak or fishes is provided also in such a construction as to be easily mounted by engagement of its loops with the spits.

BRIEF DESCRIPTION OF THE DRAWINGS

FIGS. 4a and 4b show front sectional views illustrating the inside structure of a barbecuing cooker, wherein only the spits for barbecue are seen in FIG. 4a and the parching cage for parching coffee beans or the like is seen in FIG. 4b.

DETAILED DESCRIPTION OF THE INVENTION

Figure 1:
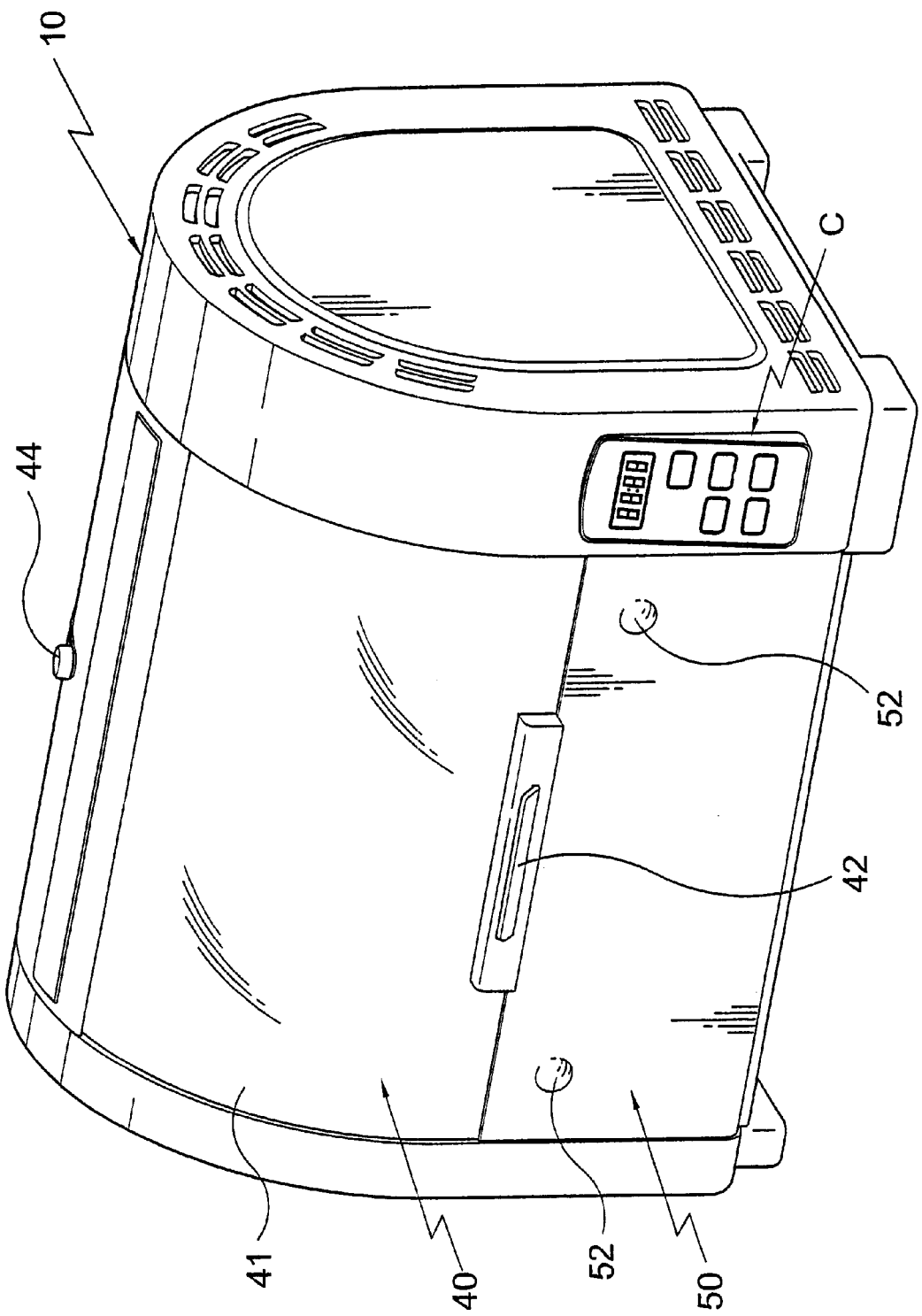
FIG. 1 shows the perspective view of a barbecuing cooker according to a preferred embodiment of the present invention.

The present invention will be described in detail with regard to preferred embodiment in conjunction with the attached drawings.

As shown in FIGS. 1 to 9, a barbecuing device according to the invention comprises a main body 10 with side and rear reflecting plates 20 and 30 as the inner walls of a cooking chamber 11; an upper and lower door 40 and 50 for opening or closing the inlet opening of the cooking chamber 11; a ceramic heater 60 mounted on the rear reflecting plate 30; spits 80 provided rotatably through gear wheels 70 positioned at the central areas of the opposite side reflecting plates 20; a motor 100 for operating the gear wheels 70 by means of a driving gear 90; a control panel C for controlling the ceramic heater 60 and motor 100; an oil receiver 110 provided at a lower part of the cooking chamber 11; and a parching cage 120 in substantially a cylindrical form, said parching cage having a cover 121 and said parching cage having a circumferential surface formed with a plurality of small holes 122 and with axial spit grooves 123 at opposite sides, said spit grooves resulting in the formation of inward protuberances 124.

Figure 2:
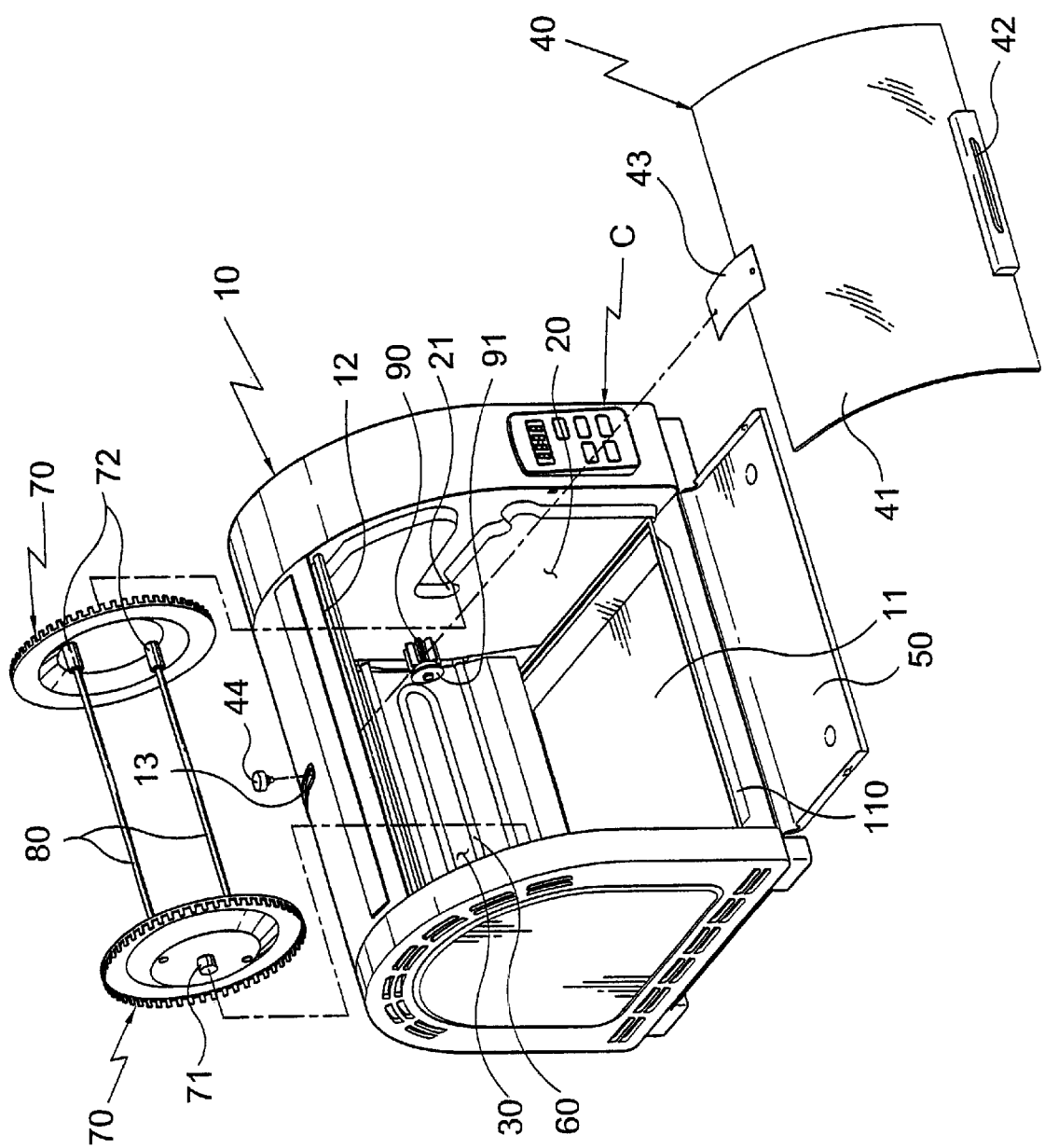
FIG. 2 shows the exploded perspective view of a barbecuing cooker according to a preferred embodiment of the present invention.

Here, the main body 10 is curved in its top area from the front side up to the rear location as shown in FIG. 2, so that the inlet opening for the cooking chamber extends so long as to reach the top position from the bottom of the front side. Such a configuration of curved formation in the top part of the main body 10 and a long extension of the inlet opening up to a top area is designed to facilitate cleaning work for the inside of the cooking chamber 11 after cooking and to expedite attaching or detaching work for spits 80.

Figure 3:
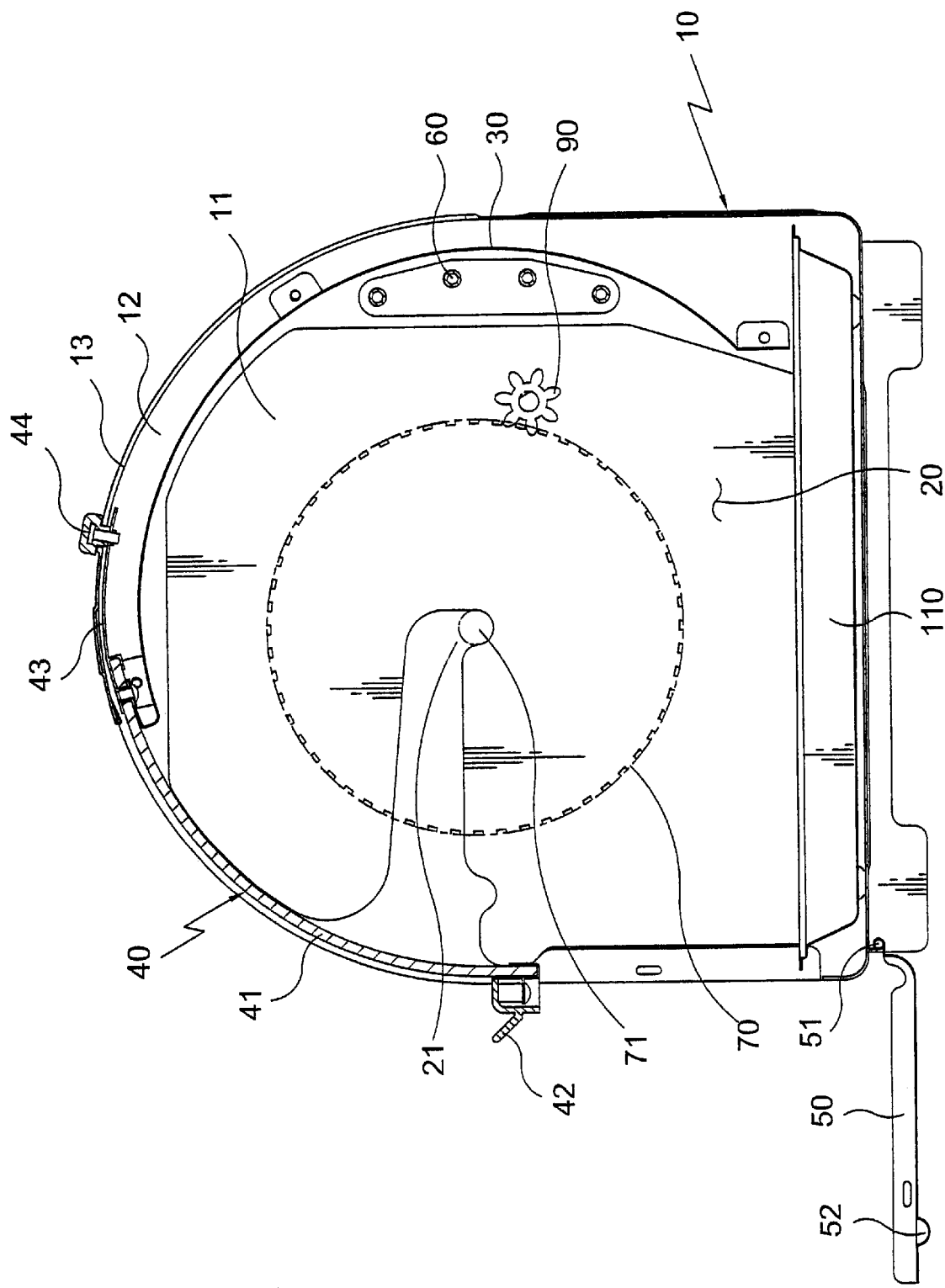
FIG. 3 shows the side sectional view illustrating an inside structure of the barbecuing cooker.

In the central area of the both reflecting plates 20, one top-open axle groove 21 is provided respectively to receive a rotary axle 71 of a gear wheel 70 rotatably, as can be seen in FIG. 3.

The rear reflecting plate 30 is provided on its surface with a nonstick ceramic coating, which emits far infrared rays. The nonstick ceramic coating also acts to maintain the surface clean against oily stains or the like as well.

The upper door 40 which serves to open or close the input opening of the cooking chamber 11 is provided with a observation window 41 and a hand grip 42 and received in a receiving space 12 of the main body 10 in a sliding manner, as shown in FIG. 2. The upper door 40 is provided on its top middle edge with a guiding plate 43 to which a guiding pin 44 is secured, wherein the guiding pin 44 is slided along a guiding gap 13.

The lower door 50 is rotatably connected at its two bottom positions to the main body 10 through hinges 51. Further the lower door 50 is provided, at two opposite positions on its front surface, with fixing projections 52, so that the projection may be easily accessed by a finger of a user through the thus-formed opening to quickly close the door, when the door was in its opened state as in FIG. 3. In order to prevent the lower door 50 from unwanted opening, the main body 10 is provided, on its opposite sides of the inlet opening, engaging projections so that they can be elastically engaged with the mating engaging recesses formed at opposite positions on the wall of the lower door 50.

Such an arrangement of the upper and lower doors for the inlet opening allows the interior of the cooking chamber 11 to be cleaned easily and the spits 80 to be mounted and dismounted easily as well.

As shown in FIG. 2, the ceramic heater 60 is provided on the rear reflecting plate 30 in order to emit far infrared rays for cooking.

The gear wheels 70, wherein two constitutes one set as seen in FIG. 2, are provided, at the outer central positions, respectively with a rotary axle 71, which protrudes to fit in the axle groove 21 in a rotatable manner. One of the set of gear wheels 70 is engaged with the driving gear 90.

Figure 7:
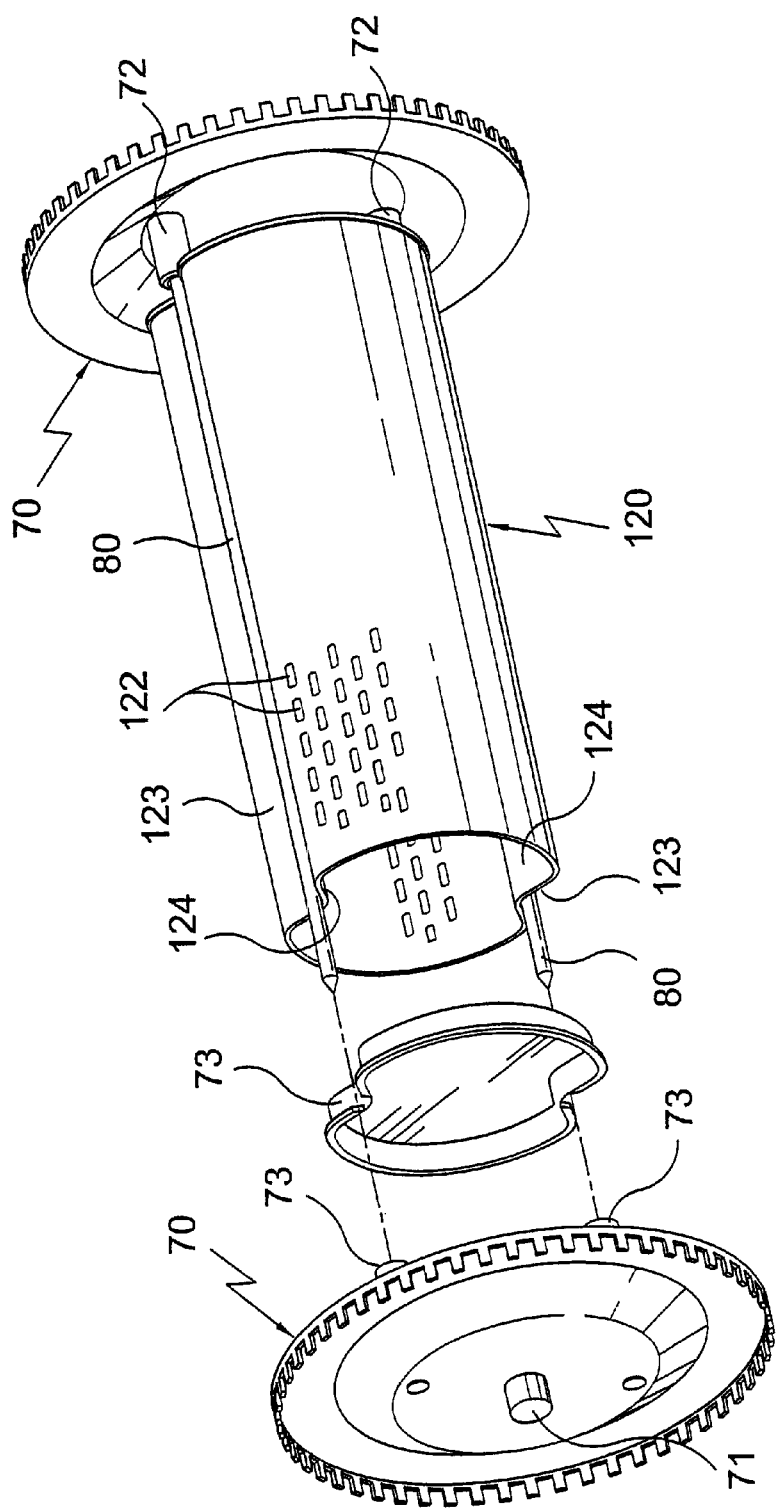
FIG. 7 shows the exploded view of a parching cage and spit according to the present invention.

On the other hand, as shown in FIG. 7, the gear wheel 70 is formed, along its circumference, with an annular tongue bent at right angle outwardly, wherein the annular tongue is formed with teeth at constant intervals so as to engaged with a driving gear 90. Such a construction of a gear wheel 70 is to prevent a slip in driving.

Moreover, a fixing element 72 and a connecting element 73 are formed on opposite sides inwardly of the opposite gear wheels 70.

The spits 80, which constitute a full set by the two as shown in FIG. 2 and through which meat pieces are stuck, are press-fitted, by their one ends, into the fixing elements 72 formed on one gear wheel 70, while the other ends of the spits 80 are connected, in a detachable manner, to the connecting elements 73 formed on the other gear wheel 70.

As shown in FIGS. 3, 4a, 4b and 6, the driving gear 90 is attached to the driving axle of the motor 100, and is meshed with one gear wheel 70 which is fitted in an axial groove 21.

Accordingly, driving the motor 100 causes the driving gear 90 connected to the driving axle to rotate, so that the gear wheel 70 meshed with the driving gear 90 is set in motion to thereby rotate the spits 80.

Outside the driving gear 90, a roller 91 for prevention of falling-off is provided to prevent the gear wheel 70 in meshed state from falling-off.

A control panel C for operating the ceramic heater 60 and motor 100, which panel is arranged on the front side of the main body 10, includes a number of actuating switches and indicators like e.g. HOUR/MIN, MIN/SEC, LAMP, MENU, PAUSE, START/RESET. Lamps to be switched on or off by a lamp operating switch are installed inside the cooking chamber 11.

Figure 9:
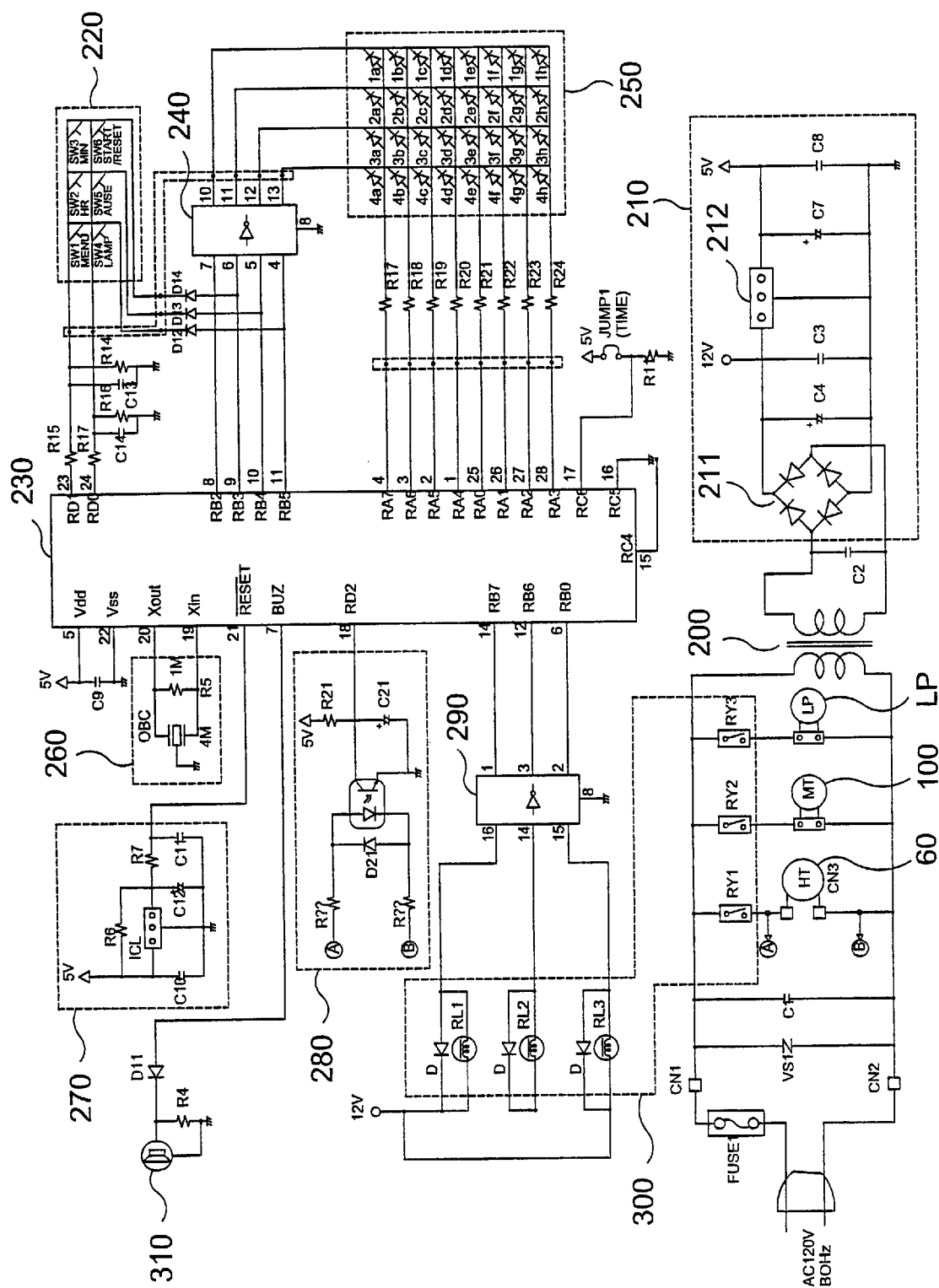
FIG. 9 shows the arrangement of circuits within the control panel of the present invention.

FIG. 9 of the attached drawings shows the arrangement of circuits within the control panel C according to the present invention.

Reference numerals 200 stands for a transformer for inducing the alternate power input on the primary side onto the secondary side, 210 for a power supplying section to transform the alternate power output on the secondary side of the transformer 200 into a direct current with predetermined voltage and to supply the current to all parts of the system, and the number 220 stands for a key inputting section including a cooking time setting key (HOUR/MIN, MIN/SEC), lamp key (LAMP), menu key (MENU: barbecue, parch), pause key (PAUSE), start and reset key (START/RESET) for inputting respective functions.

Further, the numeral 230 stands for a microcomputer for controlling the operation of overall system in response to the functions input through the key inputting section 220, under the power supplied from the power supplying section 210, the numeral 240 stands for a display driving section to drive displays based on the signals output from the microcomputer 230 and the numeral 250 stands for a display section to display the corresponding functions as they are input and also to indicate the cooking time, remaining time, temperature etc.

Moreover, the reference numeral 260 stands for an oscillating section to provide clock to the microcomputer 230 by generating oscillation, the numeral 270 stands for a reset section to input reset signals to the microcomputer 230 when inputting the reset key in the key inputting section 220 and the numeral 280 stands for a system supervising section to supervise any abnormality in the system.

In addition, the numeral 290 stands for a load driving section to drive relay in accordance with the relay controlling signals output from the microcomputer 230 and the numeral 300 does for a relay section to operate the ceramic heater 60, motor 100 and lamps LP in accordance with the relay driving signals output from the load driving section 290.

In the control panel C constructed as described above, first the transformer 200 causes an induced alternate current on the secondary side from the alternate current power through the input power cord, which induced alternate current is full-wave rectified through a bridge diode 211, and smoothed by means of a capacitor C3 to produce 12 V DC voltage in the power supplying section 210. Then, the 12 V DC voltage is supplied to various electric parts as required and is also formed into a constant voltage of 5 V by means of a constant voltage producer 212 so that it may be supplied to the microcomputer 230 as a driving power.

Thus, when a user inputs a certain function for cooking through the key inputting section 220 in avoidance of operation period when inputting is not allowed, the microcomputer 230 perceives such an input and outputs corresponding signals to the display driving section 240 to display data through data outputting port RA7 through RA3.

Then, the display section 250 displays corresponding functions visually.

Hereupon, the display section 250 also has the function of showing the remainder of cooking time and etc. beside the function of displaying.

Now, the displaying and controlling processes when functions are selected are explained below.

For example, in selecting barbecuing menu, the hour key can be simultaneously selected beginning with 0:00 hour, in unit of an hour up to the maximum of 3 hours beyond which a new recycling starts from 0 hour and so on. Similarly, the minute key can be input at an increment of 5 minutes up to the maximum of 55 minutes. Accordingly, each one combined selection of time keys allows the maximum setting of 3 hours and 55 minutes.

On the other hand, when a user presses the reset key in the key inputting section 220, initialization of the microcomputer 230 is caused in the reset section 270.

Then, in case a function is input by a user, cooking has ended or an abnormality in the system is found, the microcomputer 230 causes a buzzer 310 to produce relevant sounds. The buzzer can produce different sounds for input of a function, warning and completion of cooking.

The system supervising section 280 acts to supervise an abnormal state such as a trouble under the control of the microcomputer 230. If any trouble is detected, the microcomputer 230 drives the buzzer 310 and simultaneously causes the data for the trouble to appear on the displaying section 250.

Next, to perform cooking, the microcomputer 230 outputs a relay controlling data, which are received by a load driving section 290. Then, the load driving section 290 drives plural relays selectively in the relay sections 300.

The relay section 300 includes the set of a relay coil RL1 and a relay switch RY1 for operating the ceramic heater 60 and heater 51, the set of a relay coil RL2 and a relay switch RY2 for driving the motor 220 for operation of the rotary plate 60 and the set of a relay coil RL3 and a relay switch RY3 for operating lamps LP.

A relay coil and a relay switch constitute one functional set. When a relay coil is caused to conduct electric current, the corresponding relay switch is turned on, so that a load connected to the relay switch described above may be supplied with the driving power to operate the load.

For example, in order to operate the ceramic heater 60, the relay coil RL1 is caused to conduct the driving current, and then the corresponding relay switch RY1 is turned on, with the result that the ceramic heater 60 are supplied with the commercial alternate electric current.

Concurrent operation of the ceramic heater 60, motor 100 and lamps LP is avoided due to the control of the microcomputer 230, wherein the order of operation is such that the ceramic heater 60 is first operated and the actuation of the motor 100 follows and in contrast, lamps LP are operated separately.

When pressing the pause key during operation, the microcomputer 230 temporarily terminates the current process. As a matter of course, the word "pause" is shown on the display to inform the user of the current state.

Further, the control panel C is provided with a cooling function, therefore it is possible that after the operation of broiling for a selected time following selection of parch menu, the heaters are turned off and cooling operation proceeds for e.g. 5 minutes.

As described above, both the oil receiver 110 and the rear reflecting plate 30 are coated with nonstick ceramics to promote thermal performance and cleaning operation.

The parching cage 120 is used to parch the coffee beans, beans, corns, popcorns and the like. As shown in FIGS. 4b and 7, the parching cage 120 is formed with spits grooves 123 at diametrically opposite and longitudinal locations on the circumference to selectively engage with the spits 80. The inward protrusions 124 formed as the result of the spits grooves 123 serve to give a tumbling movement to the contents during the rotation of the cage so that uniform mixing and so uniform heating may be achieved. The outer circumference of the parching cage 120 are uniformly formed with small holes 122 to discharge the husks of beans to the outside.

Figure 8:
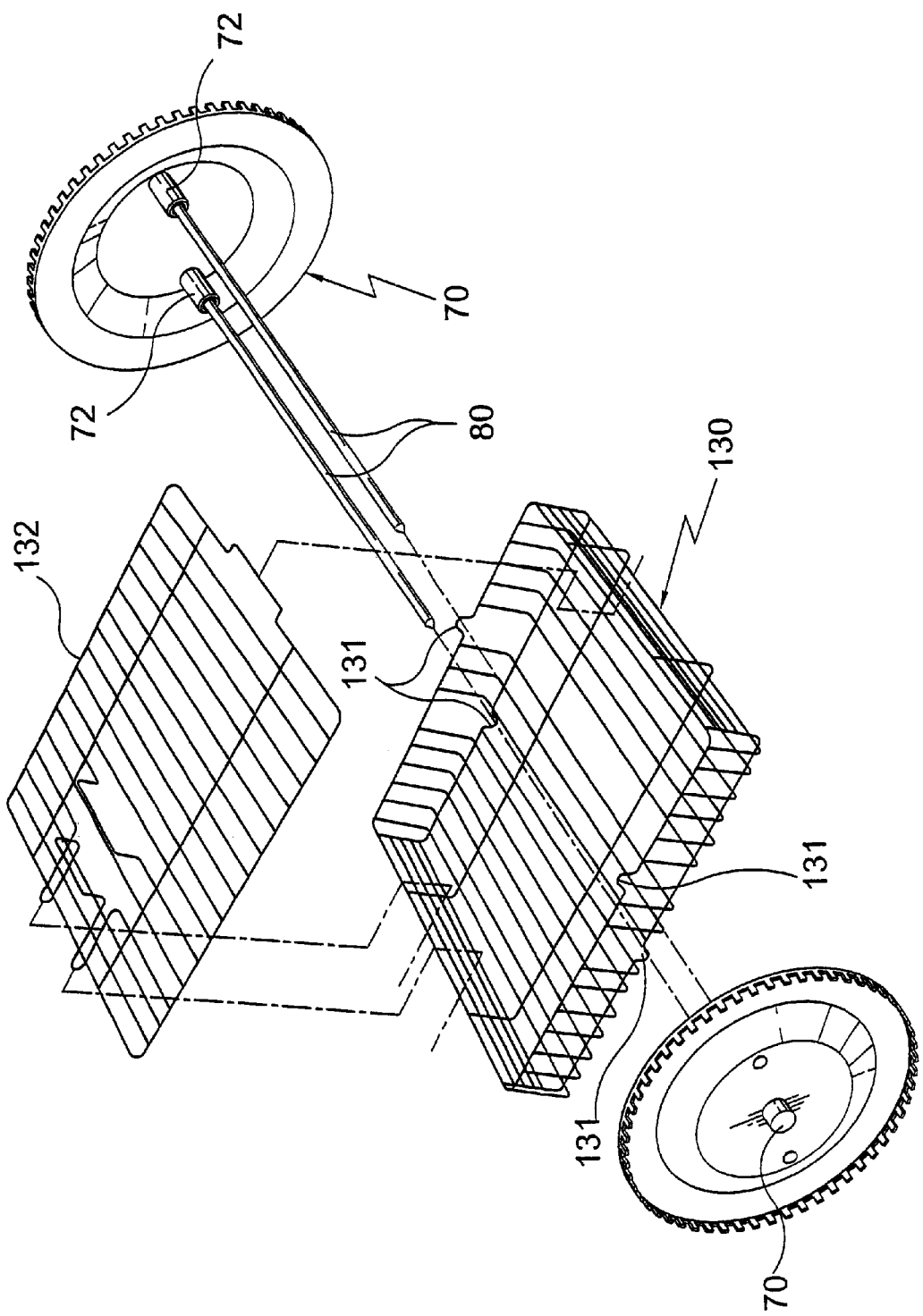
FIG. 8 shows an exploded perspective view of a basket with spits according to an embodiment of the invention.

Furthermore, in an embodiment of the present invention, there is further provided a basket 130 which is fabricated of wire gauges and is formed with projecting loops 131 on both sides for receiving the spits 80, as depicted in FIG. 8. The basket 130 is also provided with a cover 132 fabricated of wire gauges.

Such a basket 130 is assembled on the spits 80 when need be and is used to cook steak, fish or the like.

The general operation of the barbecuing device constructed as described above according to the invention is now described.

Figure 4A:
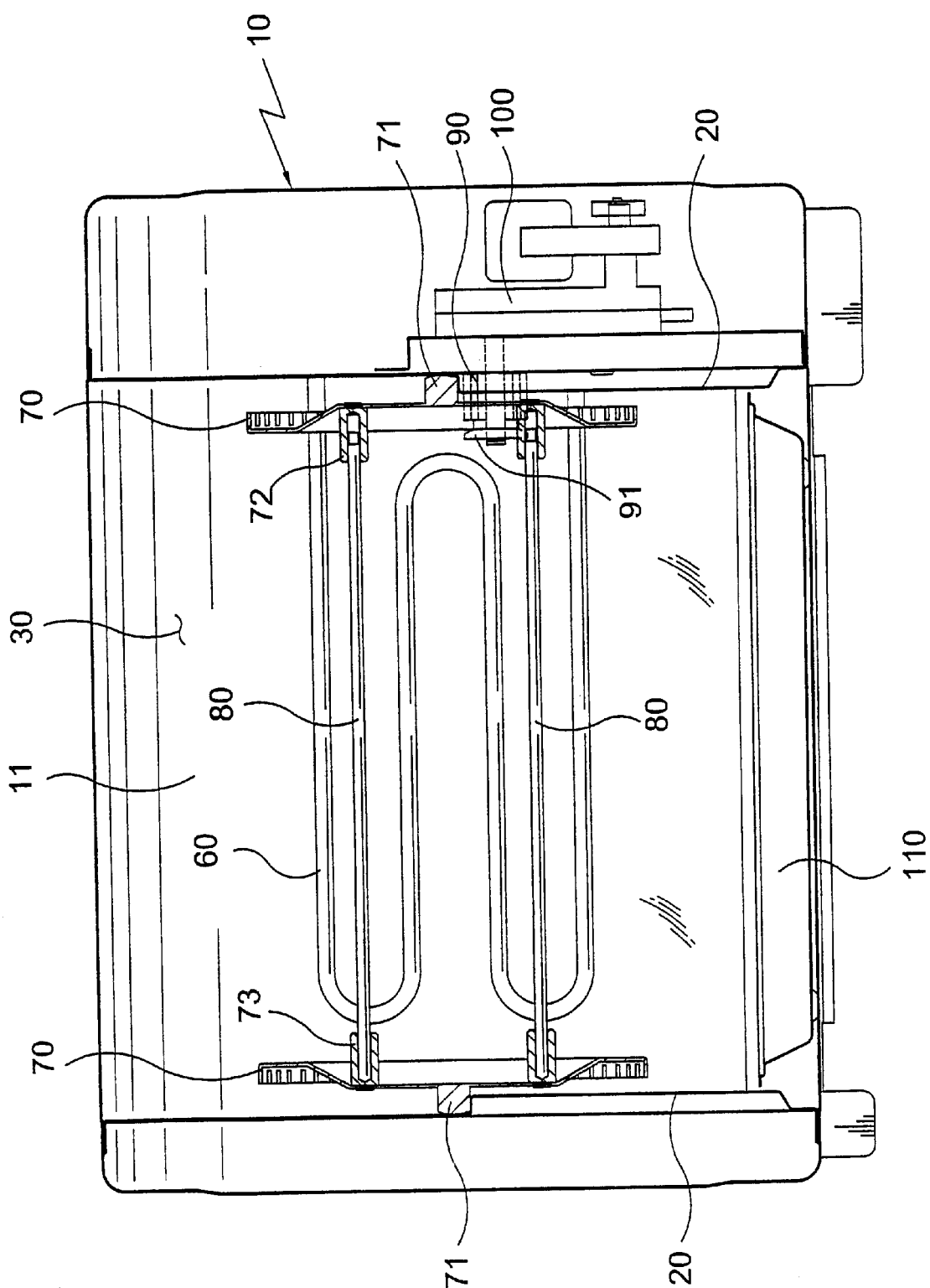
Figure 5:
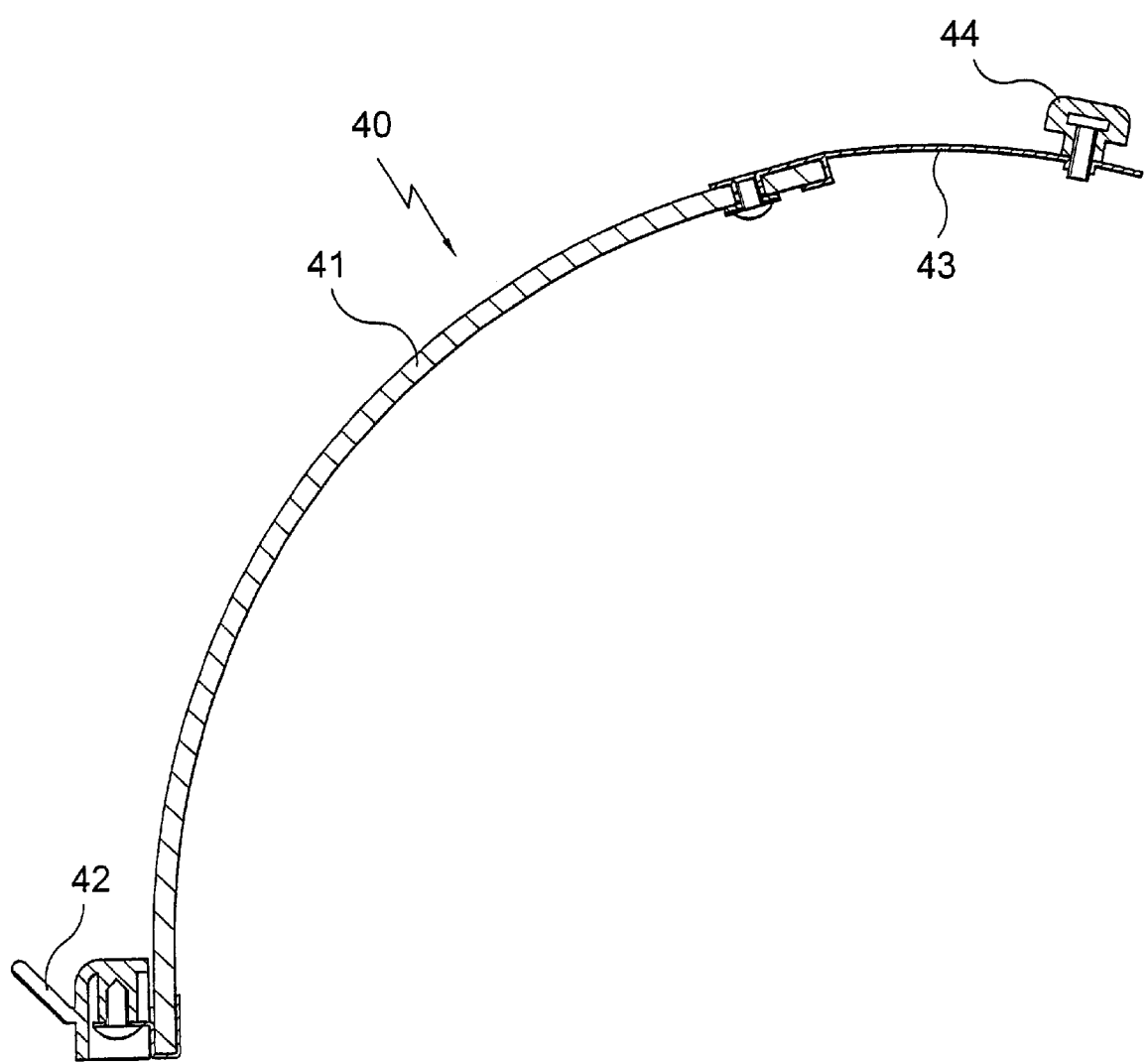
FIG. 5 shows the side sectional view illustrating the structure of the upper door.
Figure 6:
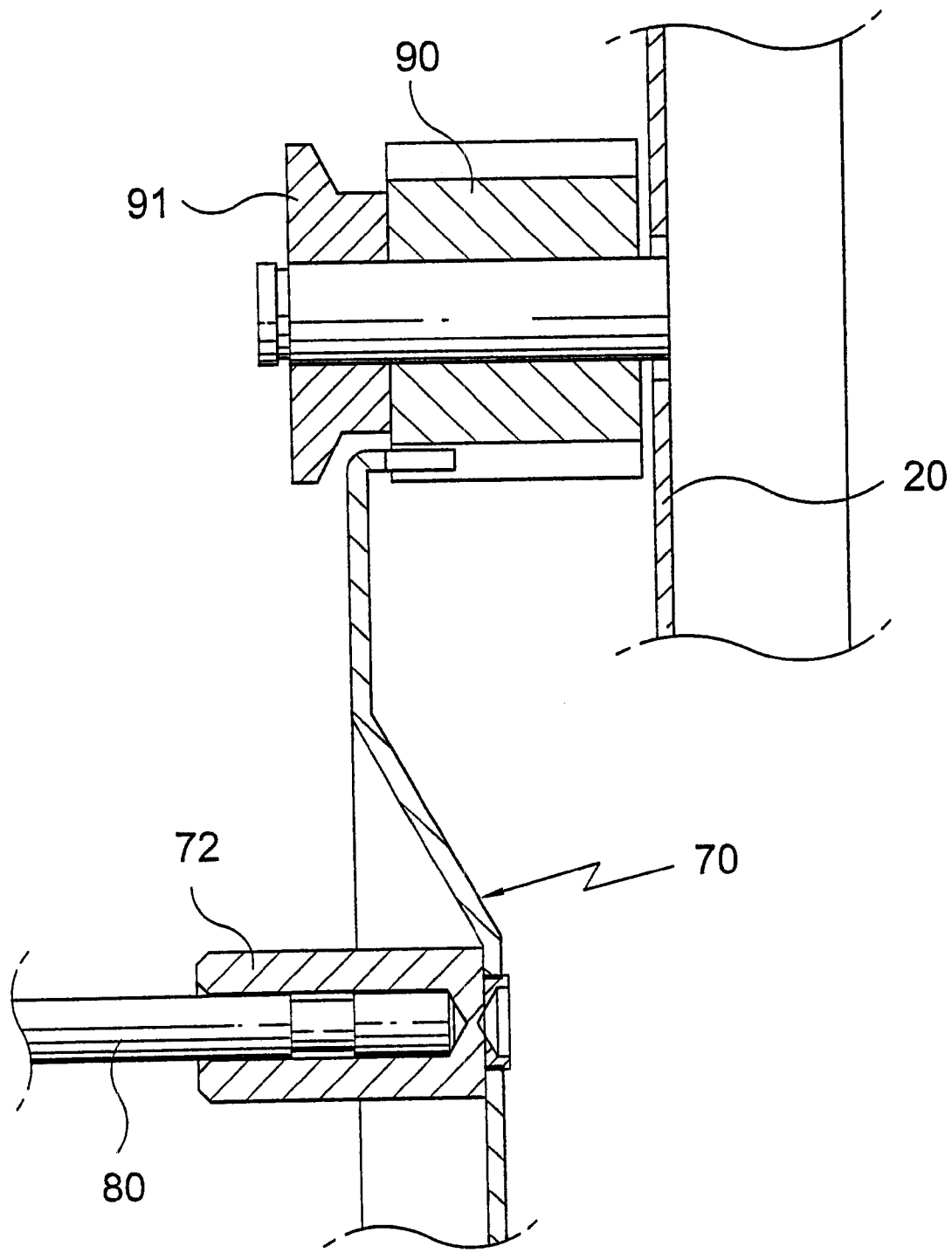
FIG. 6 shows the gear wheel meshed in a driving gear in cross section.

When barbecuing chickens, turkeys, ducks or the like in their whole, the spits 80 are first fastened to the connecting elements 73 of a gear wheel 70 by one ends, with the spits retaining the whole raw meat pricked, then the meat is settled by inserting the rotary axles 71 of the gear wheels 70 in the axle grooves 21 as shown in FIG. 4a, and the upper and down doors 40 and 50 are closed over the inlet opening of the cooking chamber 11. Subsequently, selected operating switches on the control panel C are operated to heat the ceramic heater 60 and to slowly rotate the spits 80 through the driving gear 90 connected to the motor 100, so that the meats may be broiled and cooked.

On the other hand, in the case that coffee beans, ordinary beans, corns or popcorns are parched, the contents are directly put in the parch cage 120, the spits 80 are inserted in the spits grooves 123 of the parch cage 120, with the feed opening closed with the lid 121, and then the free ends of the spits 80 are joined to the connecting means 73 of the gear wheel 70, and the rotary axles 71 of both gear wheels 70 are fitted in the axle grooves 21 to support the cage rotatably. The inlet opening of the cooking chamber 11 is closed with the doors 40 and 50. Subsequently, appropriate operating switches on the control panel C are operated to heat the ceramic heater 60 and to slowly rotate the cage 120 through the driving force of the motor 100, so that the contents may be parched uniformly. At that time, the protrusions 124 protruding toward the inside of the cage serve to give a tumbling or stirring movement to the contents during the rotation of the cage so that uniform parching may be achieved. The husks of beans peeled off are discharged to the outside through the slots 122 on the circumference of the parching cage 120.

In still the case of broiling fish or the equivalent, the contents are directly put in the basket 130, the spits 80 are inserted in the loops 131 of the basket 130, with the cover 132 closed, and then the free ends of the spits 80 are fitted in the connecting means 73 of the gear wheel 70, and the rotary axles 71 of both gear wheels 70 are fitted in the axle grooves 21 to support the basket rotatably. The inlet opening of the cooking chamber 11 is closed with the doors 40 and 50. Subsequently, corresponding operating switches on the control panel C are operated to function the ceramic heater 60 and to slowly rotate the basket 130 through the driving force of the motor 100, so that the content may be broiled uniformly.

The objects to be cooked through the use of spits 80, parching cage 120 and basket 130 are cooked for the period as set by a user through the operating switches. And when the cooking is completed, the ceramic heater 60 and motor 100 are sequentially cut off the power and thereafter the user may open the upper and lower doors 40 and 50 and withdraw the cooked contents.

Accordingly, because the present invention depends on the far infrared rays from the ceramic heater 60 as an far infrared emitter in cooking chickens, turkeys, ducks, steaks, fish or the like, the cooking time is shortened, the objects under cooking are uniformly parched on the surface as well as in deep inside and therefore the food tastes tender and pure with fat moderately removed.

In addition to the barbecued cooking of chickens, turkeys, ducks etc., convenient cooking of coffee beans, beans, corns and popcorns as well as steak and fishes is also possible by using the parching cage 120 or basket 130. The possibility of preparing food with a good quality and taste seems attributable to nonstick-ceramics-coated rear reflecting plate 30 and oil receiver 110 beside the ceramic heater 60, which emit far infrared rays.

Moreover, the main body 10 according to the invention has a contour of half cylinder in the top area and the inlet opening for the cooking chamber 11 extends long up to a top location from a front side, which opening is covered by the upper and lower doors 40 and 50 having the observation window 41 and the hand grip 42. Therefore, cleaning of the cooking chamber 11 can be conducted easily and mounting or dismounting of the spits 80 is also possible without any difficulty. As mentioned earlier, the nonstick coating on the rear relflector plate 30 and oil receiver 110 plays a part too.

It is to be understood that, while the invention was described mainly with respect to a specific embodiment, the invention is never restricted to that embodiment and a variety of modifications and alterations would be possible to a man skilled in the art by referring to the description or drawings presented here and within the spirit of the invention and thus those modifications or alterations are to fall within the scope of the invention, which scope should be limited only by the attached claims.

What is claimed is:

1. A barbecuing cooker, which comprises:
   a main body with side and rear reflecting plates as the inner walls of a cooking chamber;
   an upper and lower door for opening or closing the inlet opening of the cooking chamber;
   a ceramic heater mounted on the rear reflecting plate;
   spits provided rotatably through gear wheels positioned at the central areas of the opposite side reflecting plates;
   a motor for operating the gear wheels by means of a driving gear; and
   a control panel for controlling the ceramic heater and motor; an oil receiver provided at a lower part of the cooking chamber.

2. The barbecuing cooker according to claim 1, wherein the top portion of said main body is formed of a curved surface extending from the front side to the top central area, the rear area of the main body is formed with a receiving space and guiding gap, the upper door provided with an observation window and a hand grip can be received in the receiving space in a sliding manner, and upper door is provided on its top middle edge with a guiding plate to which a guiding pin can be secured, the guiding pin being slided along a guiding gap.

3. The barbecuing cooker according to claim 1, wherein the lower door is rotatably connected, at bottom opposite positions, to the main body through hinges and is provided, at top opposite positions, with fixing projections.

4. The barbecuing cooker according to claim 1, wherein the surface of the rear reflecting plate is coated with nonstick ceramics.

5. The barbecuing cooker according to claim 1, wherein an axle groove is arranged respectively in the central area of the both reflecting plates, rotary axles, which protrude to fit in the axle grooves in a rotatable manner, are respectively provided at the central positions outside the two gear wheels which constitute one set and are positioned opposite to each other, fixing elements for receiving one side ends of spits as well as connecting elements for detachably receiving the other side ends of spits are provided inside each gear wheel, and a disconnection preventing roller is provided to prevent the gear wheel in meshed state from falling-off.

6. The barbecuing cooker according to claim 1, wherein the gear wheel is formed, along its circumference, with an annular tongue bent at right angle outwardly, said annular tongue being formed with teeth at fixed intervals so as to engaged with a driving gear.

7. The barbecuing cooker according to claim 1, herein the surface of the oil receiver is coated with nonstick ceramics.

8. The barbecuing cooker according to claim 1, wherein the barbecuing cooker is provided with a basket which is fabricated of wire gauges and is formed with projecting loops on opposite sides for receiving the spits and a basket is provided with a cover fabricated of wire gauges.

9. The barbecuing cooker according to claim 1, wherein the cooker further includes:
   a circuit in the control panel which has a transformer to induce the alternate power input on the primary side onto the secondary side;
   a power supplying section to transform the alternate power output on the secondary side of the transformer into a predetermined DC voltage and to supply the DC voltage to all parts of the system;
   a key inputting section with at least one of a time functional key, lamp key, menu key, pause key, and start and reset key for inputting a variety of functions;
   a microcomputer supplied with the driving power from a power supplying section and functioning to control the operation of overall system in response to the functions input through the key inputting sections;
   a display driving section to drive displays based on the signals output from the microcomputer;
   a display section to display the corresponding functions as input and also to indicate the cooking time, remaining time, temperature and the like;
   an oscillating section to provided clock to the microcomputer by generating oscillation;
   a reset sections to input reset signals to the microcomputer when the reset key is input in the key inputting section;
   a system supervising section to supervise any abnormality in the system;
   a load driving section to drive relays in accordance with the relay controlling signals output from the microcomputer; and
   a relay section to operate the ceramic heater, motor, and lamps in accordance with the relay driving signals output from the load driving section.

10. The barbecuing cooker according to claim 1, further comprising a parching cage in substantially a cylindrical form, said parching cage having a cover and said parching cage having a circumferential surface formed with a plurality of small holes and with axial spit grooves at opposite sides, said spit grooves resulting in the formation of inward protuberances.

* * * * *